United States Patent
Kanda et al.

(10) Patent No.: US 6,500,090 B2
(45) Date of Patent: Dec. 31, 2002

(54) CONTROL APPARATUS FOR AN AUTOMOTIVE CONTINUOUSLY VARIABLE TRANSMISSION

(75) Inventors: Tomoyuki Kanda, Saitama (JP); Tamotsu Kotegawa, Saitama (JP); Yoshimichi Tsubata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/944,591

(22) Filed: Sep. 4, 2001

(65) Prior Publication Data

US 2002/0028724 A1 Mar. 7, 2002

(30) Foreign Application Priority Data

Sep. 5, 2000 (JP) .......................... 2000-268970

(51) Int. Cl.[7] .............................. B60R 41/12
(52) U.S. Cl. ..................... 477/45; 477/50; 475/114; 475/127; 474/28
(58) Field of Search .................. 477/45, 46, 50, 477/95; 475/114, 127, 128; 474/8, 28

(56) References Cited

U.S. PATENT DOCUMENTS 5,762,576 A * 6/1998 Aoki et al. .................. 474/28

FOREIGN PATENT DOCUMENTS

| JP | 402159451 | * 6/1990 | .................. 474/12 |
| JP | 9-303550 | 11/1997 | |

OTHER PUBLICATIONS

U.S. publication 2002/0086759 filed on Dec. 2001, Imai et al.*

* cited by examiner

Primary Examiner—Sherry Estremsky
Assistant Examiner—Tisha D. Lewis
(74) Attorney, Agent, or Firm—Armstrong, Westerman & Hattori, LLP

(57) ABSTRACT

In a control apparatus for an automotive continuously variable transmission having a forward-reverse selector mechanism in which a gear ratio for reverse is set closer to a speed reducing side than a gear ratio for forward and a belt type continuously variable transmission mechanism, a PH pressure that is outputted from a first regulator valve and a PL pressure that is outputted from a second regulator valve are changeably supplied to one and the other of a hydraulic cylinder of a drive pulley and a hydraulic cylinder of a driven pulley via a shift control valve. A hydraulic pressure supplied to a reversing hydraulic pressure connecting element from a reversing manual valve is inputted into an oil chamber of a first regulator valve so that the PH pressure is increased with the hydraulic pressure so inputted.

5 Claims, 2 Drawing Sheets

CONTROL APPARATUS FOR AN AUTOMOTIVE CONTINUOUSLY VARIABLE TRANSMISSION

BACKGROUND OF THE INVENTION

1. Field of the Invention

The present invention relates to a control apparatus for an automotive continuously variable transmission for transmitting power via a forward-reverse selector mechanism and a belt type continuously variable transmission mechanism.

2. Description of the Related Art

Conventionally, there is known as a control apparatus of this type for an automotive continuously variable transmission, a control apparatus for an automotive continuously variable transmission comprising a manual valve for changing over a forward-reverse selector mechanism, a first regulator valve for outputting a first pulley control pressure, a second regulator valve for outputting a second pulley control pressure which is lower than the first pulley control pressure, and a shift control valve for changing gear ratios for the continuously variable transmission mechanism by changeably supplying the first pulley control pressure and the second pulley control pressure to one and the other of a hydraulic cylinder of a drive pulley and a hydraulic cylinder of a driven pulley of the continuously variable transmission mechanism.

Incidentally, in general, a single pinion planetary gear mechanism is used as the forward-reverse selector mechanism, and when this occurs, the gear ratio for the reverse is set closer to the speed reducing side than the gear ratio for the forward. Due to this, an excessive torque is caused to act on the belt of the belt type continuously variable transmission mechanism when the vehicle starts to reverse, and this causes a possibility that the durability of the belt may be badly affected.

To eliminate such a drawback, conventionally JP-A-9-303550 proposes a control apparatus for controlling a continuously variable transmission mechanism such that a gear ratio thereof is changed and controlled with a shift control valve so as to be set closer to a speed increasing side at the time of reversing than forwarding.

In the control apparatus proposed in the aforesaid Japanese unexamined patent publication, a torque increase occurring due to deceleration in the forward-reverse selector mechanism at the time of reversing is offset with a torque decrease occurring due to acceleration in the continuously variable transmission mechanism to thereby prevent an excessive torque from acting on the belt of the continuously variable transmission mechanism when the vehicle starts to reverse. However, when the system is down, the shift control valve is held at the OD position where the shift control valve supplies the first pulley control pressure to the hydraulic cylinder of the drive pulley and the second pulley control pressure to the hydraulic cylinder of the driven pulley, which cannot perform the shift control of the continuously variable transmission. Due to this, the load carried by the belt when the system is down increases higher at the time of reverse running than forward running. To cope with this, there has been a demand to design belts and transmissions which can guarantee the durability thereof at the time of reverse running with the system being down, and attempting to satisfy the demand calls for increase in weight and cost.

SUMMARY OF THE INVENTION

The invention was made in view of the aforesaid drawback, and an object thereof is to provide a control apparatus for an automotive continuously variable transmission which can make the load carried by a belt of a continuously variable transmission mechanism equal between when running forward and reverse.

With a view to attaining the object, according to a first aspect of the invention, there is provided control apparatus for an automotive continuously variable transmission for transmitting power via a forward-reverse selector mechanism in which a gear ratio for a reverse is set closer to a speed reducing side than a gear ratio for a forward and a belt type continuously variable transmission mechanism, the control apparatus comprising a manual valve for changing over the forward-reverse selector mechanism, a first regulator valve for outputting a first pulley control pressure, a second regulator valve for outputting a second pulley control pressure which is lower than the first pulley control pressure, and a shift control valve for changing gear ratios for the continuously variable transmission mechanism by changeably supplying the first pulley control pressure and the second pulley control pressure to one and the other of a hydraulic cylinder of a drive pulley and a hydraulic cylinder of a driven pulley of the continuously variable transmission mechanism, wherein when a system goes down the shift control valve is adapted to be held at such a position that the first pulley control pressure is supplied to the hydraulic cylinder of the drive pulley, whereas the second pulley control pressure is supplied to the hydraulic cylinder of the driven pulley, the control apparatus being characterized in that a control pressure changing means is provided for increasing a differential pressure between both the first and second pulley control pressures higher at the time of reversing when a hydraulic pressure is supplied from the manual valve to a reversing hydraulic pressure connecting element for changing over the forward-reverse selector mechanism to the reverse by receiving an hydraulic pressure from the manual valve than at the time of forwarding.

When the differential pressure between both the first and second pulley control pressures, even if the shift control valve is held at the OD position where the first pulley control pressure is supplied to the hydraulic cylinder of the drive pulley, whereas the second pulley control pressure is supplied to the hydraulic cylinder of the driven pulley, the gear ratio of the continuously variable transmission mechanism is shifted to the speed increasing side. Thus, according to the invention, the gear ratio of the continuously variable transmission mechanism when the system is down is changed closer to the speed increasing side at the time of reversing than forwarding so as to make the load on the belt equal between reverse running and forward running.

Here, in order to increase the differential pressure between both the first and second pulley control pressures the second pulley control pressure, which is relatively lower, may be reduced, but this produces slippage of the belt. To cope with this, it is desirable that the control pressure changing means is adapted to increase the first pulley control pressure by inputting a hydraulic pressure supplied from the manual valve to the reversing hydraulic pressure connecting element into a pressure regulating oil chamber of the first regulator valve.

In addition, in the event that the amount of increase in the differential pressure between both the first and second pulley control pressures is set such that the total gear ratio of the forward-reverse selector mechanism and the continuously variable transmission mechanism gets equal between the forward time and the reverse time, the difference in speed of the axels between the forward running and the reverse running is eliminated, and this becomes advantageous in improving the operation feeling at the time of reverse moving.

DETAILED DESCRIPTION OF THE PREFERRED EMBODIMENTS

Figure 1:
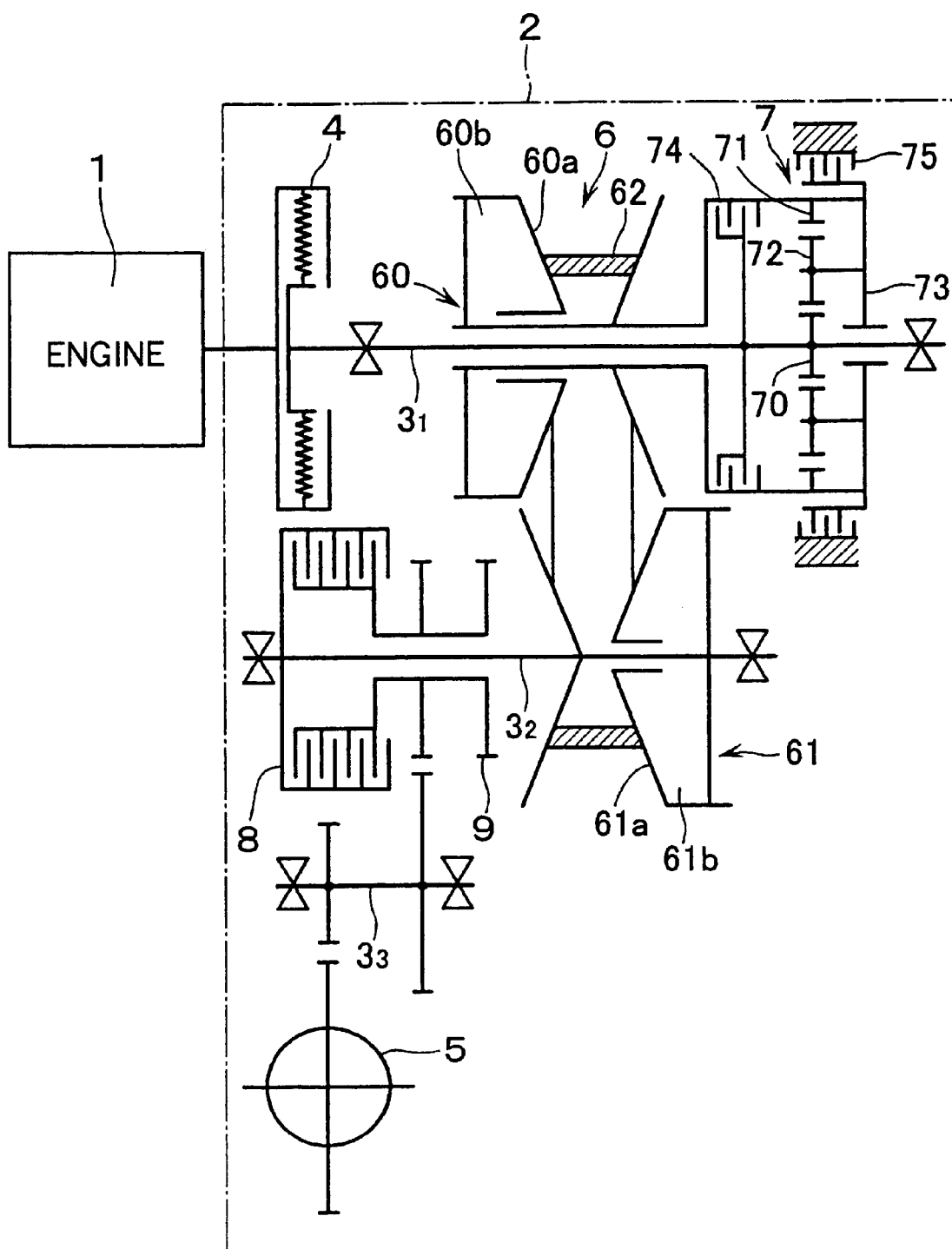
FIG. 1 is a skeleton diagram showing a continuously variable transmission to which an apparatus according to the invention is applied.

Referring to FIG. 1, reference numeral 1 denotes an engine, and reference numeral 2 denotes a continuously variable transmission, which includes three first to third shafts $3_1, 3_2, 3_3$ which are arranged in parallel to each other. The first shaft $3_1$ is connected to the engine 1 via a damper 4, while the third shaft $3_3$ is connected to driving wheels (not shown) of a vehicle via a differential gear 5.

A continuously variable transmission mechanism 6 is provided between the first shaft $3_1$ and the second shaft $3_2$. The continuously variable transmission mechanism 6 is constituted by a drive pulley 60 rotatably supported on the first shaft $3_1$, a driven pulley 61 fixed onto the second shaft $3_2$ and a belt 62 extended between the two pulleys 60, 61. The mechanism 6 controls internal pressures of hydraulic cylinders 60b, 61b for pressing movable sheaves 60a, 61a so as to change the diameter of the belt 62 wound around the pulleys 60, 61, respectively for implementing continuous shifting.

A forward-reverse selector mechanism 7 is provided on an input side of the continuously variable transmission mechanism 6 for connecting the drive pulley 60 to the first shaft $3_1$. In addition, a starter clutch 8 is provided on an output side of the continuously variable transmission mechanism 6 for connecting the second shaft $3_2$ to the third shaft $3_3$. In the figure, reference numeral 9 denotes a parking brake.

The forward-reverse selector mechanism 7 is constituted by a single pinion planetary gear mechanism having a sun gear 70 fixed to the first shaft $3_1$, a ring gear 71 rotably supported on the first shaft $3_1$, a planetary gear 72 meshing with the sun gear 70 and the ring gear 71 and a carrier 73 for carrying the planetary gear 72 which is connected to the drive pulley 60. In addition, there are provided a forward clutch 74 which is a forwarding hydraulic pressure connecting element for connecting the carrier 73 to the first shaft $3_1$ and a reverse brake 75 which is a reversing hydraulic pressure connecting element for stopping the rotation of the ring gear 71, whereby when the forward clutch 74 is turned on, the drive pulley 60 rotates in a normal direction so as to transmit power in a forward direction, whereas when the reverse brake 75 is turned on, the drive pulley 60 rotates in a reverse direction so as to transmit power in a reverse direction.

Figure 2:
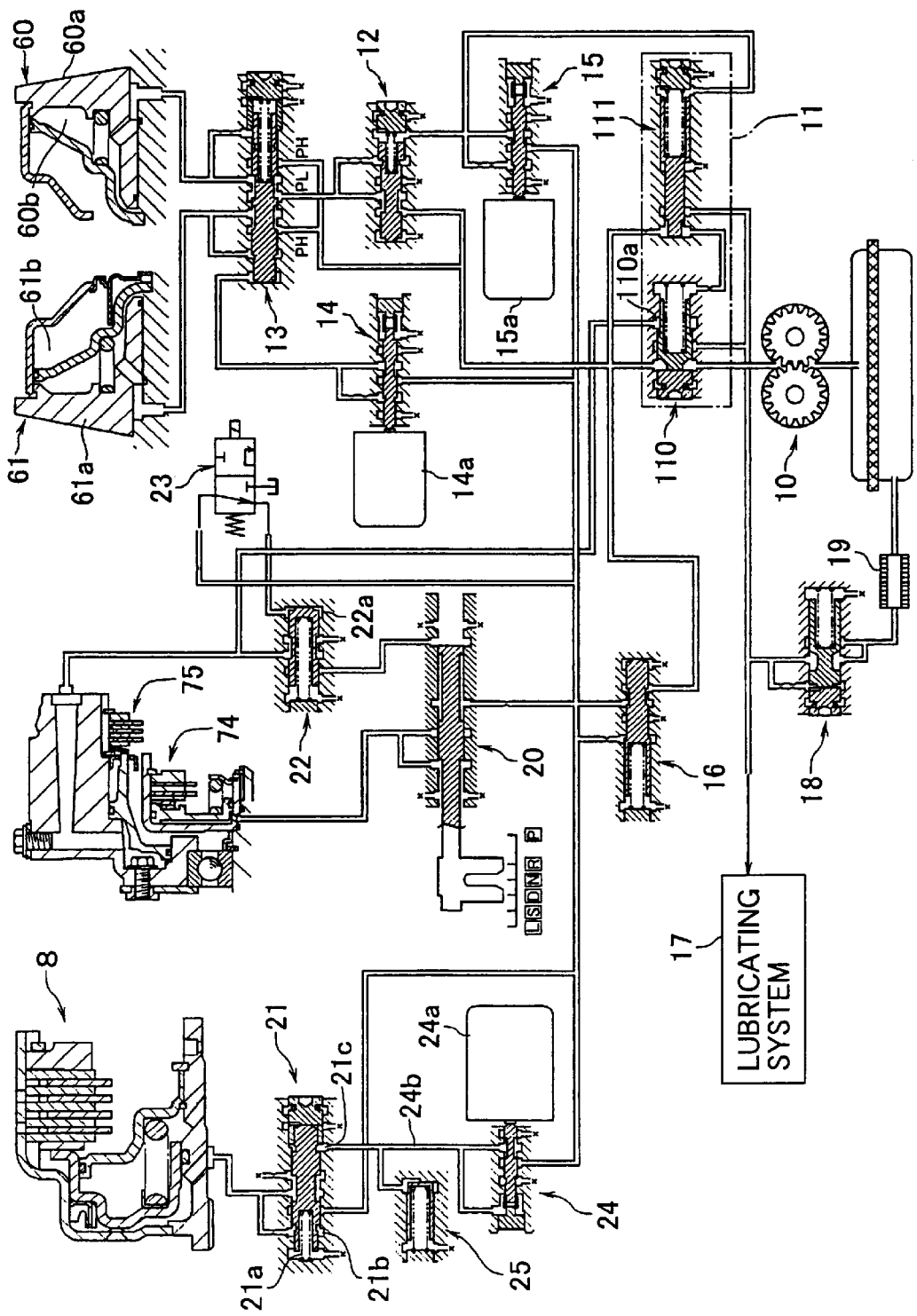
FIG. 2 is a diagram showing a hydraulic circuit for the control apparatus of the continuously variable transmission shown in FIG. 1.

A control apparatus for the aforesaid continuously variable transmission 2 includes, as shown in FIG. 2, a hydraulic pump 10, a first regulator valve 11, a second regulator valve 12, a shift control valve 13, and a first linear solenoid valve 14. The hydraulic pump 10 is adapted to be driven by the engine 1. The first regulator valve 11 outputs a first pulley control pressure (hereinafter, referred to as a PH pressure) using a hydraulic pressure discharged from the hydraulic pump 10 as an origin pressure. The second regulator valve 12 outputs a second pulley control pressure (hereinafter, referred to as a PL pressure) using the PH pressure as an origin pressure, the second pulley control pressure being lower than the PH pressure. The shift control valve 13 changeably supplies the PH pressure and the PL pressure to one and the other of the hydraulic cylinder 60b of the drive pulley 60 and the hydraulic cylinder 61b of the driven pulley 61. The first linear solenoid valve 14 controls the shift control valve 13. Thus, a differential pressure between both the hydraulic cylinders 60b, 61b of the drive pulley 60 and the driven pulley 61 is controlled by the first linear solenoid valve 14 via the shift control valve 13 for implementing continuously variable gear changes.

Incidentally, the PL pressure should be set as low as possible within an extent that there is not caused slippage of the belt with a view to reducing friction loss at a belt entering point and a belt released point of the pulley. To this end, a second linear solenoid valve 15 is provided for controlling the second regulator valve 12, and the PL pressure is adapted to be controlled so as to be increased or decreased by the second linear solenoid valve 15 via the second regulator valve 12 in response to the output torque from the engine 1. Additionally, the first regulator valve 11 is constituted by a main valve 110 provided at a position a long an oil path leading to the hydraulic pump 10 and an auxiliary valve 111 for leaking a feedback pressure provided at a position along an oil path for feeding the PH pressure back to the main valve 110. The auxiliary valve 111 is pressed toward a non-leak side by virtue of a hydraulic pressure outputted from the second linear solenoid valve 15 so that the PH pressure is kept higher than the PL pressure to a certain extent. Note that the first and second linear solenoid valves 14, 15 output hydraulic pressures in accordance with current values of current with which solenoids 14a, 15a of the respective linear solenoid valves are energized using as an original pressure a modulator pressure (a constant pressure which is lower than the PH pressure) from a modulator valve 16. The modulator valve 16 is provided at a position along an oil path branched from an oil path for supplying the PH pressure for the shift control valve 13. In addition, leak oil from the first regulator valve 11 is supplied to a lubricating system 17 of the automatic transmission 2, as well as a lubricating regulator valve 18 via an oil cooler 19.

Additionally, provided on the control apparatus are a manual valve 20 for controlling oil to be supplied to and discharged from the forward clutch 74 and the reverse brake 75 and a pressure regulator valve 21 for regulating the hydraulic pressure of the starter clutch 8. The manual valve 20 can freely be changed over among six positions such as "P" for parking, "R" for reversing, "N" for neutral, "D" for normal forward running, "S" for sporty running and "L" for holding lower speed. The modulator pressure is adapted to be supplied to the reverse brake 75 at the "R" position, whereas the modulator pressure is adapted to be supplied to the forward clutch 74 at the positions such as "D", "S" and "L". In addition, a reverse inhibitor valve 22 is provided at a position along an oil path between the reverse brake 75 and the manual valve 20 in such a manner as to be opened and/or closed freely. An oil chamber 22a is provided at a right end of the reverse inhibitor valve 22 for pressing the same valve to a left open side. And, there is provided an electromagnetic valve 23 for freely changing the reverse inhibitor valve 22 over between a state in which the modulator pressure is inputted into the oil chamber 22a and a state in which the oil chamber 22a is opened to the atmosphere. Accordingly, during the forward running, the oil chamber 22a is opened to the atmosphere by the electromagnetic valve 23 so as to close the reverse inhibitor valve 22, whereby the supply of hydraulic pressure to the reverse brake 75 is prevented when the manual valve 20 is changed to the "R" position while running forward. When the manual valve 20 is changed to the R" position after the vehicle is stopped once, the modulator pressure is inputted into the oil chamber 22a by the electromagnetic valve 23 to thereby open the reverse inhibitor valve 22, whereby the hydraulic pressure is supplied to the reverse brake 75.

In addition, a pressure regulating oil chamber 110a is provided in the main valve 110 of the first regulator valve 11 for pressing the main valve 110 toward a non-leak side in such a manner that the oil chamber 110a is connected to an oil path between the reverse inhibitor valve 22 and the reverse brake 75, whereby a hydraulic pressure to be supplied to the reverse brake 75 at the time of reversing is inputted into the pressure regulating oil chamber 110a so as to increase the PH pressure. Here, the gear ratio of the forward-reverse selector mechanism 7 becomes 1.0 when the vehicle runs forward, in which the forward clutch 74 is engaged, but it becomes greater than 1.0 when the vehicle runs reverse, in which the reverse brake 75 is engaged to thereby cause the deceleration. Therefore, an excessive torque is acted on the belt 62 of the continuously variable transmission mechanism 6 when the vehicle starts to move reverse, the durability of the belt 62 being thereby affected badly. As this occurs, while the torque acting on the belt 62 can be reduced by changing and controlling the continuously variable transmission mechanism 6 such that the gear ratio thereof when the vehicle starts to reverse is set closer to a speed increasing side than when it starts to move forward. However, when the system goes down, energizing all the solenoids is stopped and the hydraulic pressure outputted from the normally open first linear solenoid valve 14 becomes high, the shift control valve 13 being held at the OD position where the PH pressure is supplied to the hydraulic cylinder 60b of the drive pulley 60, whereas the PL pressure is supplied to the hydraulic cylinder 61b of the driven pulley 61, thereby disabling the implementation of shift control of the continuously variable transmission mechanism 6. However, according to the embodiment of the present invention, as has been described above, the PH pressure is increased at the time of reversing, and the differential pressure between the PH pressure and the PL pressure is increased higher than at the time of forwarding, and therefore, the gear ratio of the continuously variable transmission mechanism 6 when the system is down is set closer to the speed increasing side at the time of reversing than at the time of forwarding, whereby the load acting on the belt becomes equal between the forward running and the reverse running. In addition, the amount of increase in PH pressure or in differential pressure between the PH pressure and the PL pressure is set such that the total gear ratio of the forward-reverse selector mechanism 7 and the continuously variable transmission mechanism 6 becomes equal between the forward running and the reverse running. Owing to this, a difference in speed of the axels between the forward running and the reverse running is eliminated, and the operation feeling at the time of reversing is improved.

The pressure regulator valve 21 is a valve for regulating the pressure of the starter clutch 8 (hereinafter, referred to as a clutch pressure) using the modulator pressure as an original pressure. The valve 21 is constructed so as to be pressed toward a right close side by means of a spring 21a and by virtue of the clutch pressure inputted into an oil chamber 21b on the left-hand side and to be pressed toward a left open side by virtue of the hydraulic pressure outputted from a third linear solenoid valve 24 to be inputted into an oil chamber 21c on the right-hand side. The third linear solenoid valve 24 is constructed to output a hydraulic pressure corresponding to a value of current with which a solenoid 24a is energized using the modulator pressure as an original pressure, whereby the clutch pressure is regulated to a hydraulic pressure corresponding to the hydraulic pressure outputted from the third linear solenoid valve 24 via the pressure regulating valve 21.

An accumulator 25 of a small capacity (for example, in the order of 0.5 cc) for vibration isolation is provided at a position along an oil path 24b which inputs the hydraulic pressure outputted from the third linear solenoid valve 24 into the oil chamber 21c of the pressure regulating valve 21. Here, in the event that a judder contributing to stick slippage occurs while the slippage control of the starter clutch 8 is being carried out, the pressure regulating valve 21 vibrates due to a change in clutch pressure that is inputted into the oil chamber 21b, and the hydraulic pressure in the oil path 24b varies due to a variation in capacity of the oil chamber 21c in association with the vibrations. However, the hydraulic pressure variation in the oil path 24b is absorbed by the accumulator 25, and therefore, no hydraulic pressure variation is transmitted to the third linear solenoid valve 24, thus no drawback being caused that the third linear solenoid valve 24 vibrates by receiving the hydraulic pressure variation. Note that since the capacity of the accumulator 25 is small, there is caused no risk that the response of controlling the clutch pressure by the third linear solenoid clutch 24 is deteriorated.

While only certain embodiments of the invention have been specifically described herein, it will apparent that numerous modifications may be made thereto without departing from the spirit and scope of the invention.

As is clear from what has been described heretofore, according to the invention, the gear ratio of the continuously variable transmission mechanism when the system is down can be changed to be set closer to the speed increasing side at the time of reversing than at the time of forwarding, and the load on the belt can be made equal between the reverse running and the forward running, this obviating the necessity of any particular design in order to guarantee the durability of the belt when running reverse, thereby attempting to reduce the weight and cost of the control apparatus.

What is claimed is:

1. A control apparatus for an automotive continuously variable transmission for transmitting power via a forward-reverse selector mechanism in which a gear ratio for reverse is set closer to a speed reducing side than a gear ratio for forward and a belt type continuously variable transmission mechanism having a drive pulley and a driven pulley, said control apparatus comprising:

a manual valve for changing over said forward-reverse selector mechanism;

a first regulator valve for outputting a first pulley control pressure;

a second regulator valve for outputting a second pulley control pressure which is lower than said first pulley control pressure;

a shift control valve for changing gear ratios for said continuously variable transmission mechanism by changeably supplying said first pulley control pressure and said second pulley control pressure to one and the other of a hydraulic cylinder of said drive pulley and a hydraulic cylinder of said driven pulley, said shift control valve being held, when a system goes down, at such a position that said first pulley control pressure is supplied to said hydraulic cylinder of said drive pulley, whereas said second pulley control pressure is supplied to said hydraulic cylinder of said driven pulley;

a reversing hydraulic pressure connecting element for changing over said forward-reverse selector mechanism to the reverse; and control pressure changing means for increasing a differential pressure between both said first and second pulley control pressures higher at the time of reversing when the hydraulic pressure is supplied from said manual valve to said reversing hydraulic pressure connecting element than at the time of forwarding, by receiving a hydraulic pressure from said manual valve.

2. A control apparatus for an automotive continuously variable transmission as set forth in claim 1, wherein said control pressure changing means inputs a hydraulic pressure to be supplied from said manual valve to said reversing hydraulic pressure connecting element into a pressure regulating oil chamber of said first regulator valve, to thereby increase said first pulley control pressure.

3. A control apparatus for an automotive continuously variable transmission as set forth in claim 2, further comprising:

a reverse inhibitor valve disposed on an oil path between said reversing hydraulic pressure connecting element and said manual valve, for changing over the supply of the hydraulic pressure from said manual valve to said reversing hydraulic pressure connecting element, wherein an oil path between said reverse inhibitor valve and said reversing hydraulic pressure connecting element is communicated with said pressure regulating oil chamber of said first regulator valve.

4. A control apparatus for an automotive continuously variable transmission as set forth in claim 1, wherein the amount of increase in the differential pressure between both said first and second pulley control pressures is set such that the total gear ratio of said forward-reverse selector mechanism and said continuously variable transmission mechanism gets equal between the forward time and the reverse time.

5. A control apparatus for an automotive continuously variable transmission as set forth in claim 1, wherein said reversing hydraulic pressure connecting element is a reverse brake.

\* \* \* \* \*